United States Patent Office 3,567,731
Patented Mar. 2, 1971

3,567,731
METAL NITROSYL HALIDE COMPLEXES
Donald H. Kubicek and Roger F. Kleinschmidt, Bartlesville, Okla., assignors to Phillips Petroleum Company
No Drawing. Filed Dec. 26, 1967, Ser. No. 693,067
Int. Cl. C07d 31/24; C07f 11/00
U.S. Cl. 260—270                    7 Claims

ABSTRACT OF THE DISCLOSURE

A Group VI–B metal carbonyl complex is contacted with nitrosyl halide to produce a Group VI–B metal nitrosyl halide complex.

---

This invention relates to an improved process for the preparation of metal complex compounds. In another aspect this invention relates to a method for preparing a component for a catalyst useful in the disproportionation of an olefin. In still another aspect this invention relates to a method for preparing a novel, homogeneous catalyst system.

New catalytic processes have been discovered, in recent years, for the conversion of olefins to other olefinic products including products of both higher and lower molecular weight whereby olefins of relatively low value are converted into olefins of higher value. Such conversions have been carried out in a substantially homogeneous state using, as catalysts, selected coordination compounds of molybdenum or tungsten, among others, in combination with suitable catalytic adjuvants to produce olefin products of increased value including solid products, for example, rubber suitable for the manufacture of tires, wire coating, footwear and other industrial products.

It is an object of this invention to provide a method for producing a catalyst component useful in a catalyst system for the conversion of olefin hydrocarbons. It is also an object of this invention to provide a method for preparing a homogeneous catalyst component comprising a coordination compound of molybdenum, tungsten or chromium which, together with a catalytic adjuvant comprises the catalyst system. It is still another object of this invention to provide a method for making a homogeneous catalyst component comprising a coordination compound of molybdenum, tungsten or chromium which, together with a catalytic adjuvant, constitutes a catalyst system useful for the disproportionation of an olefin or the dimerization of an olefin.

Heretofore, the techniques which have been available for the preparation of complexes containing both nitrosyl and halogen groups have been unsatisfactory. For example, in prior art methods, carbonyl compounds such as Mo(CO)$_6$ are treated with reagents such as NOCl to products Mo(NO)$_2$Cl$_2$. This latter compound is an unstable material, decomposing rapidly in air and losing nitric oxide. Because of this instability, the reaction has been found difficult to reproduce with consistency. It has now been found that the desired VI–B metal complexes can be prepared with greater ease by contacting a nitrosyl halide and a Group VI–B metal carbonyl which has already been complexed with another stabilizing ligand. As used herein the term "ligand" is defined as a molecule having an element with a pair of electrons capable of bonding with a metal atom to form a complex. The term "complex" is synonymous with a coordination compound which is a combination of a metal atom with one or more electronically-rich radicals or molecules or atoms.

The Group VI–B metal carbonyl complexes which are applicable as a starting material for the present invention are those having the formula M(CO)$_4$L$_2$ wherein M is chromium, molybdenum, or tungsten; and L is a ligand such as

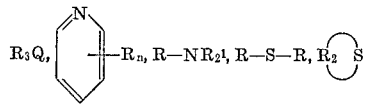

wherein Q is phosphorus, antimony, or arsenic, each R is an aromatic or saturated aliphatic hydrocarbon radical having up to about 20 carbon atoms, $n$ is a whole number from 0 to 5 inclusive, each R$^1$ is selected from hydrogen and R radicals, and R$^2$ is a saturated or ethylenically unsaturated divalent hydrocarbon radical having 3–10 carbon atoms; or a bidentate chelating diolefin such as 1,5-COD- (1,5-cyclooctadiene), norbornadiene, or dicyclopentadiene, one such bidentate ligand being sufficient for each molecule of the complex. The total number of carbon atoms of the organic ligand portions of each such starting material will not exceed about 24.

Some specific examples of the above-described class of ligands are triphenylphosphine,
tribenzylstibine,
tricyclohexylarsine,
tributylphosphine,
tri(2,4-dimethylphenyl)arsine,
trimethylstibine,
pyridine,
ethylpyridine,
pentamethylpyridine,
ethylamine,
tri-n-butylamine,
diphenylamine,
4-isobutylaniline,
methyl sulfide,
methyl n-amyl sulfide,
dodecyl sulfide,
p-tolyl sulfide,
thiophene,
hexamethylene sulfide, and the like, and mixtures thereof.

According to the process of this invention, the suitable Group VI–B metal complex is contacted with at least 1–2 moles and preferably with more than about 2 moles of a nitrosyl halide for each mole of the group VI–B complex, although greater quantities of the nitrosyl halide can frequently be used with advantage. There is no theoretical upper limit on the amount of nitrosyl halide that can be used and, therefore, the upper limit will be dictated by practical considerations, for example, the amount of nitrosyl halide that can be handled by the equipment available. The contacting is carried out at a temperature in the range of about 0 to about 150° C., preferably in the presence of a diluent in which the reactants are at least partially soluble such as chlorobenzene, carbon tetrachloride, ethylene dichloride, methylene chloride, and the like. Halogenated diluents are preferred although other diluents such as benzene and cyclohexane can be utilized if desired. The reaction can be carried out at any convenient pressure, for example, about atmospheric to 100 p.s.i.g., and superatmospheric pressures can be utilized to facilitate the contact of the gaseous nitrosyl chloride with the Group VI–B metal-containing solution. The time of contact can vary from about 1 minute to 24 hours or more and it is frequently convenient simply to bubble excess nitrosyl chloride through the solution containing the carbonyl-containing starting compound at atmospheric pressure allowing the evolved carbon monoxide to be removed from the system.

Any nitrosyl halide can be used. Because of its effectiveness and greater availability, however, nitrosyl chloride is generally preferred.

Some examples of Group VI-B metal-containing starting compounds are:

$Mo(CO)_4(triphenylphosphine)_2$
$Cr(CO)_4(pyridine)_2$
$W(CO)_4(thiophene)_2$
$Mo(CO)_4(1,5\text{-}COD)$
$W(CO)_4(tributylarsine)_2$
$Mo(CO)_4(trimethylstibine)_2$
$W(CO)_4(tribenzylphosphine)_2$ and the like, and mixtures thereof. Compounds such as these can be prepared by methods known in the art. For example, $W(CO)_6$ can be treated with triphenylphosphine to produce $W(CO)_4(triphenylphosphine)_2$.

The process of the present invention can produce nitrosyl halide complexes having the formula $M(NO)_2L_1$ or $_2X_2$ wherein M, L, and X are as defined earlier.

The invention is further illustrated by the following specific embodiment.

EXAMPLE I

Preparation of bis(triphenylphosphine)dinitrosyldichloromolybdenum

Bis(triphenylphosphine)molybdenum tetracarbonyl was prepared by refluxing together 2 g. of molybdenum hexacarbonyl and 4 g. of triphenylphosphine in 200 ml. of dry n-heptane. The insoluble product was removed by filtration, washed with acetone, and dried under vacuum.

The above-prepared compound was stirred with 50 ml. of dry chlorobenzene under a nitrogen atmosphere. Nitrosyl chloride was then bubbled into this solution which first turned yellow with the appearance of a flocculent solid. The solid redissolved, forming a green color. Additional nitrosyl chloride addition caused the mixture to turn a yellow-brown.

A 5 ml. sample of this solution was removed for subsequent olefin disproportionation catalyst preparation and the remainder was evaporated, yielding a green solid melting at 257–265° C. The green solid was $Mo(NO)_2$-$(triphenylphosphine)_2Cl_2$.

The 5 ml. portion of molybdenum complex mentioned above was mixed with 0.2 ml. of methylaluminum sesquichloride and 10 ml. heptene-2 at ice bath temperature and was diluted with an additional 5 ml. chlorobenzene. This reaction mixture was allowed to stir for 45 minutes at ice bath temperature after which a sample was withdrawn for gas-liquid chromatographic analysis which showed the following in weight percent:

Butene-2 ------------------------------------ 16.8
Heptene-2 ----------------------------------- 64.3
Decenes ------------------------------------- 18.8

The analysis showed that the catalyst system was very active for the disproportionation of heptene-2.

EXAMPLE II

Preparation of bis(triphenylphosphine)dinitrosyldichlorochromium

Into a 7-ounce pressure bottle were charged 0.1 g. of $(triphenylphosphine)_2Cr(CO)_4$ and 5 ml. of dry chlorobenzene. The bottle was flushed with nitrogen, evacuated, and nitrosyl chloride was admitted to restore atmospheric pressure. After 45 minutes, the solution had turned a dark brown and contained $(triphenylphosphine)_2Cr(NO)_2Cl_2$. The solution, when contacted with a suitable amount of an adjuvant such as ethylaluminum dichloride, is active for the dimerization of ethylene.

That which is claimed is:

1. A process which comprises:
   (a) contacting a nitrosyl halide and a metal carbonyl complex having the formula: $Cr(CO)_4L_y$ wherein $y$ is 1 or 2; when $y$ is 2, L is a ligand comprising a molecule having an element with a pair of electrons capable of bonding with a metal atom selected from

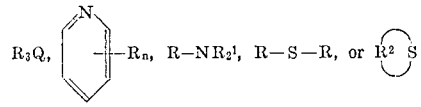

wherein Q is phosphorus, antimony or arsenic, each R is an aromatic or saturated aliphatic hydrocarbon radical having up to about 20 carbon atoms, $n$ is a whole number from 0 to 5 inclusive, each $R^1$ is selected from hydrogen and R radicals, and $R^2$ is a saturated or ethylenically unsaturated divalent hydrocarbon radical having 3–10 carbon atoms; when $y$ is 1, L is a bidentate chelating diolefin selected from the group 1,5-cyclooctadiene, norbornadiene, and dicyclopentadiene, one such bidentate ligand being sufficient for each molecule of the complex, the total number of carbon atoms of the organic ligand portions of each such starting material will not exceed about 24 to form a nitrosyl halide complex having the formula $Cr(NO)_2L_yX_2$ wherein X is a halide; and
   (b) recovering said nitrosyl halide complex.

2. A process according to claim 1 wherein L is a ligand represented by the formula $R_3Q$ wherein Q is phosphorus, antimony or arsenic; and R is an aromatic or saturated aliphatic hydrocarbon radical having up to about 20 carbon atoms.

3. A process according to claim 1 wherein L is a ligand represented by the formula

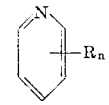

wherein R is an aromatic or saturated aliphatic hydrocarbon radical having up to about 20 carbon atoms; and $n$ is a whole numeral from 0 to 5.

4. A process according to claim 1 wherein M is chromium; L is triphenylphosphine; and the nitrosyl halide is nitrosyl chloride.

5. A process according to claim 1 wherein each mole of Group VI–B metal complex is contacted with at least 1–2 moles of nitrosyl halide, at a temperature in the range of about 0 to 150° C., and a pressure in the range of about atmospheric to 100 p.s.i.g. for about 1 minute to 24 hours.

6. The process of claim 1 wherein said nitrosyl halide and said metal carbonyl complex are contacted at a temperature in the range of about 0 to 150° C.

7. The process of claim 6 wherein said nitrosyl halide and said metal carbonyl complex are contacted at a pressure in the range of about 0 to 100 p.s.i.g. for a time from about 1 minute to 24 hours.

References Cited

Cotton et al.: Inorg. Chem. Chem. 3 (1964), pp. 1609–12.

Johnson: J. Chem. Soc. (A) (1967), pp. 475–8.

TOBIAS E. LEVOW, Primary Examiner

A. P. DEMERS, Assistant Examiner

U.S. Cl. X.R.

252—429, 431; 260—429, 438.5